United States Patent
Lytkin et al.

(10) Patent No.: US 10,193,847 B2
(45) Date of Patent: Jan. 29, 2019

(54) CONTEXTUAL FEED

(71) Applicant: Microsoft Technology Licensing, LLC, Redmond, WA (US)

(72) Inventors: Nikita Igorevych Lytkin, Sunnyvale, CA (US); Ying Xuan, Sunnyvale, CA (US); Guy Lebanon, Menlo Park, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 136 days.

(21) Appl. No.: 15/171,719

(22) Filed: Jun. 2, 2016

(65) Prior Publication Data

US 2017/0353421 A1    Dec. 7, 2017

(51) Int. Cl.
- G06F 15/16 (2006.01)
- H04L 12/58 (2006.01)
- H04L 29/08 (2006.01)
- G06F 17/30 (2006.01)

(52) U.S. Cl.
CPC ........ H04L 51/32 (2013.01); G06F 17/30516 (2013.01); G06F 17/30867 (2013.01); H04L 67/02 (2013.01); H04L 67/306 (2013.01)

(58) Field of Classification Search
CPC ....... H04L 51/32; H04L 67/306; H04L 67/02; G06F 17/30867
See application file for complete search history.

(56) References Cited

U.S. PATENT DOCUMENTS

| | | | |
|---|---|---|---|
| 2012/0296919 A1* | 11/2012 | Sinha | H04L 67/22 707/749 |
| 2013/0246521 A1* | 9/2013 | Schacht | G06Q 50/01 709/204 |
| 2014/0012619 A1* | 1/2014 | Natarajan | H04L 51/32 705/7.19 |
| 2014/0278821 A1* | 9/2014 | McConnell | G06Q 10/0639 705/7.38 |
| 2014/0351263 A1* | 11/2014 | McConnell | G06F 17/30699 707/748 |
| 2017/0171139 A1* | 6/2017 | Marra | H04L 51/32 |
| 2017/0262445 A1* | 9/2017 | Jeon | G06F 17/3053 |
| 2017/0323340 A1* | 11/2017 | Jeon | G06Q 30/0261 |

* cited by examiner

Primary Examiner — Cheikh T Ndiaye
(74) Attorney, Agent, or Firm — Schwegman Lundberg & Woessner, P.A.

(57) ABSTRACT

A news feed system of an on-line social network system obtains and utilizes data related to events that originate with members of the on-line social network system from web pages other those members' news feed pages. The news feed system monitors signals that are not related to feed interaction and generates contextual engagement features based on those signals. The news feed system associates contextual engagement features with respective member profiles and may store the association information for a period of time. The news feed system then uses these features to train a model that ranks news feed inventory and/or as input into that model.

16 Claims, 4 Drawing Sheets

CONTEXTUAL FEED

TECHNICAL FIELD

This application relates to the technical fields of software and/or hardware technology and, in one example embodiment, to system and method to generate contextual news feed in an on-line social network.

BACKGROUND

An on-line social network may be viewed as a platform to connect people and share information in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be include one or more web pages, or a structured representation of the member's information in XML (Extensible Markup Language), JSON (JavaScript Object Notation), etc. A member's profile web page of a social networking web site may emphasize employment history and education of the associated member.

A member of on-line social network may be permitted to share information with other members by posting an update that would appear on respective news feed pages of the other members. An update may be an original message, a link to an on-line publication, a re-share of a post by another member, etc. Members that are presented with such an update on their news feed page may choose to indicate that they like the post, may be permitted to contribute a comment, etc.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to generate contextual news feed in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). The profile information of a social network member may include personal information such as, e.g., the name of the member, current and previous geographic location of the member, current and previous employment information of the member, information related to education of the member, information about professional accomplishments of the member, publications, patents, etc. The profile of a member may also include information about the member's current and past employment, such as company identifications, professional titles held by the associated member at the respective companies, as well as the member's dates of employment at those companies. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members that are connected in this way to a particular member may be referred to as that particular member's connections or as that particular member's network. The on-line social network system, in some embodiments, also permits a one-sided connection, where a member is permitted to follow another member or another entity, such as a company, a university, etc. When a member follows another member or entity, that member's profile is associated with a link indicative of a one-sided connection, where, e.g., the member receives updates regarding the other member or the entity that the member follows.

An update, for the purposes of this description, is an information item for presentation to one or more members represented by respective member profiles in the on-line social network system. The updates may be presented as part of the member's so-called news feed. A news feed may be provided to a member on a dedicated web page, e.g., on a home page of the member in the on-line social network. A news feed page is generated for each member by a news feed system provided with the on-line social network system and includes items that has been determined as being potentially of interest to that member. Examples of items in the news feed generated for a member are posts and news with respect to the connections of that member and the entities that the member is following, as well as job postings that have been determined as relevant to the member. As there may be a rather large inventory of updates available for inclusion into a member's news feed, the news feed system is configured to select a subset of all available updates for inclusion into the news feed. Such selection maybe based on various selection criteria, such as, e.g., the degree of relevance of an update item with respect to the member, the degree of connection between the member and the source of the update, etc. A member for whom a news feed is being generated is referred, for the purposes of this description, a focus member, and the profile representing the focus member in the on-line social network system is referred to as a focus profile.

When the process of generating a news feed for a member is initiated, the news feed system identifies those updates that may be potentially of interest to the focus member. These updates are first processed by a so-called first pass ranker (FPR). Included in the FPR are different models trained to rank updates from respective different sources. For example, updates about members who are connections of the focus member (either mutual connections or entities that is being followed by the focus member) are ranked by one of the FPR models, the news articles are ranked by another FPR model, and the job postings are ranked by a further FPR model. From the FPR, a subset of highest-ranked update items is provided to a so-called second pass ranker (SPR). For example, from all news articles that have been processed by an associated FPR model only those sufficiently relevant to the focus member are provided to the SPR.

The SPR, which may be part of the news feed system and may employ a statistical model, processes the inventory of updates for the focus member (after it has been through the FPR) in order to select a final set of updates. The final set of updates is then included in the news feed web page that is being generated for the focus member. The SPR ranks the items in the inventory of updates utilizing, e.g., a statistical model, such as logistic regression. The SPR takes, as input, the attributes characterizing respective updates, the attributes characterizing the focus member, as well as the FPR scores generated by the FPR for respective updates. Such attributes may include the type of the item (e.g., job recommendation, connection recommendation, news article share, etc.), focus member's past counts of interactions with items of this type, profile attributes of the focus member (e.g., skills, industry, education, etc.), as well as profile attributes of the member whose activity resulted in generation of this item (e.g., member article share), etc. The SPR is trained on demand or on a periodic basis using various types of training data, such as, e.g., historical data reflecting members' interactions with updates presented in their respective news feeds.

In one example embodiment, the news feed system is configured to obtain and utilize data related to events that originate with members visiting web pages other than their news feed pages. A member may be searching for jobs or actively inviting other members to connect. This information can be used as an additional indication of relevance. For example, if the focus member has recently visited a profile page of a certain company, then it may be inferred that a job posting for a position at that company is potentially relevant to the focus member. If the focus member visited a profile page of one company recently and also visited a profile page of another company a long time ago, a job posting for a position at the former company could be treated as more relevant that the latter one. Another example, is email that a member can send to other members using email functionality provided within the on-line social network system. These signals that are not related to feed interaction are monitored, so that additional, so-called contextual engagement features, are generated for members. Different parts of the web site provided by the on-line social network system are identified by respective page keys. In one embodiment, the news feed system is configured to monitor those events originated with a focus member that are associated with page keys that are different from the page keys of the news feed pages. These contextual engagement features can reflect how recently the signals have been detected, the type of activity, the target of the activity, and the area of the web site where the interaction occurred (e.g., job search area, the area permitting making and accepting connect requests, web pages representing member profiles, etc.). Contextual engagement features may also be obtained by detecting events that originate outside of the on-line social network system, e.g., from web pages that include a functionality for sharing content with the on-line social network system (e.g., via a visual control actionable to request that the content from the web page is posed in the on-line social network system).

The news feed system associates contextual engagement features with respective member profiles and may store the association information for a period of time. The news feed system then uses these features to train SPR. Also, these contextual engagement features are used as input into the trained SPR when a feed for a member is being selected from the inventory of updates. The news feed produced using the SPR that is trained using contextual engagement features and/or using contextual engagement features as input into the trained SPR when a feed for a member is being selected is referred to as contextual news feed, for the purposes of this description. Example method and system to generate contextual news feed in an on-line social network may be implemented in the context of a network environment 100 illustrated in FIG. 1.

Figure 1:
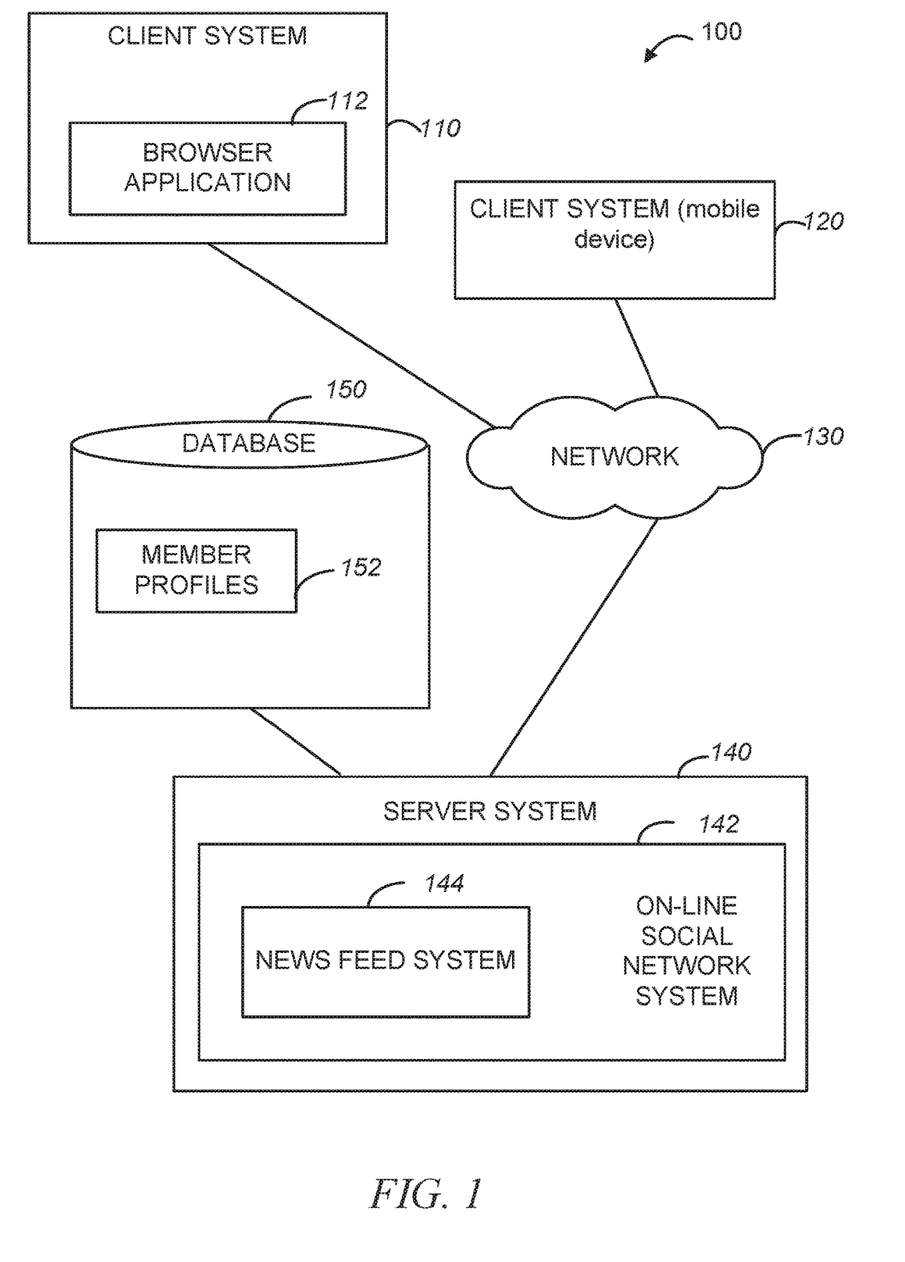
FIG. 1 is a diagrammatic representation of a network environment within which an example method and system to generate contextual news feed in an on-line social network may be implemented.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a news feed system 144 that may be utilized beneficially to determine respective success scores for higher education institutions referred to as schools for the sake of brevity. The news feed system 144 may be configured to obtain and utilize data related to events that originate with members of the on-line social network system 142 from web pages other those members' news feed pages. The news feed system 144 monitors signals that are not related to feed interaction and generates contextual engagement features based on those signals. The news feed system 144 also associates contextual engagement features with respective member profiles and stores the association information for a period of time, e.g., in the database 150. The news feed system 144 uses contextual engagement features to train a model that ranks news feed inventory (e.g., the model that is used by SPR) and/or as input into that model. An example news feed system 144 is illustrated in FIG. 2.

Figure 2:
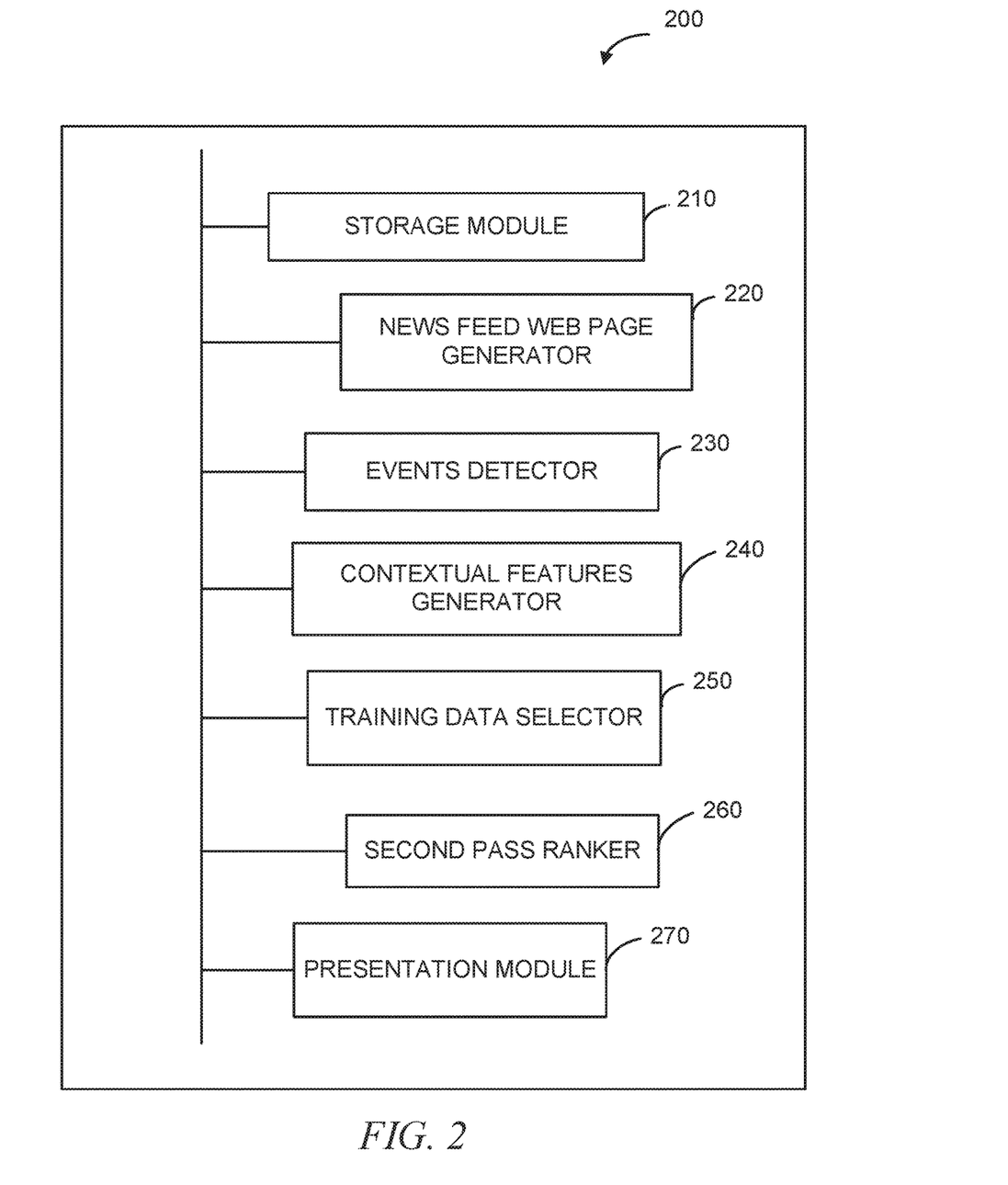
FIG. 2 is block diagram of a system to generate contextual news feed in an on-line social network, in accordance with one example embodiment.

FIG. 2 is a block diagram of a system 200 to generate contextual news feed in an on-line social network, in accordance with one example embodiment. As shown in FIG. 2, the system 200 includes a storage module 210, a news feed web page generator 220, an events detector 230, a contextual features generator 240, a training data selector 250, a second pass ranker 260, and a presentation module 270.

The storage module 210 is configured to store a profile representing a member in the on-line social network system 142 of FIG. 1. The profile is characterized by a set of profile features that reflect, e.g., the member's employment history, connections, education, etc. The news feed web page generator 220 is configured to generate news feed web pages for presentation to members represented by respective member profiles in the on-line social network system 142.

The events detector 230 is configured to detect events originated with the member and from web pages that are distinct from news feed pages generated for the member. The contextual features generator 240 is configured to generate contextual engagement features based on the events detected by the events detector 230. The training data selector 250 is configured to include features from the set of profile features, together with the contextual engagement features generated by the contextual features generator 240 as training data for training the second pass ranker 260.

The second pass ranker 260 is configured to generate respective ranks for items in an inventory of updates identified as potentially of interest to a focus member represented by a focus profile in the on-line social network system 142 and to select a subset of items from the inventory based on the generated respective ranks. The subset of items from the inventory is what is to be presented to the focus member on their news feed web page. The second pass ranker 260 uses a set of focus member features that characterize the focus profile as input. As mentioned above, the second pass ranker 260 is trained using contextual engagement features. Additionally, contextual engagement features reflecting activities of a focus member outside the news feed pages may be generated in real time and used as additional features by the second pass ranker 260 at the time when a news feed is being generated for the focus member. For example, the second pass ranker 260 can detect a request to generate a news feed web page for a focus member, detect a request to generate a news feed web page for the focus member, utilize contextual engagement features as input, generate respective ranks for items in an inventory of updates identified as potentially of interest to the focus member, and select a presentation subset of items from the focus member inventory based on the generated respective ranks. The contextual engagement features are generated based on recent events data representing events originated with the focus member from web pages that are distinct from news feed pages generated for the focus member. The recent events data represents respective events detected within a predetermined period of time (e.g., within or prior to a minute or a few minutes from the time that a request to generate news feed web page for the focus member was detected.

The presentation module 270 is configured to cause presentation of the news feed web page on a display device of the focus member. Some operations performed by the system 200 may be described with reference to FIG. 3.

Figure 3:
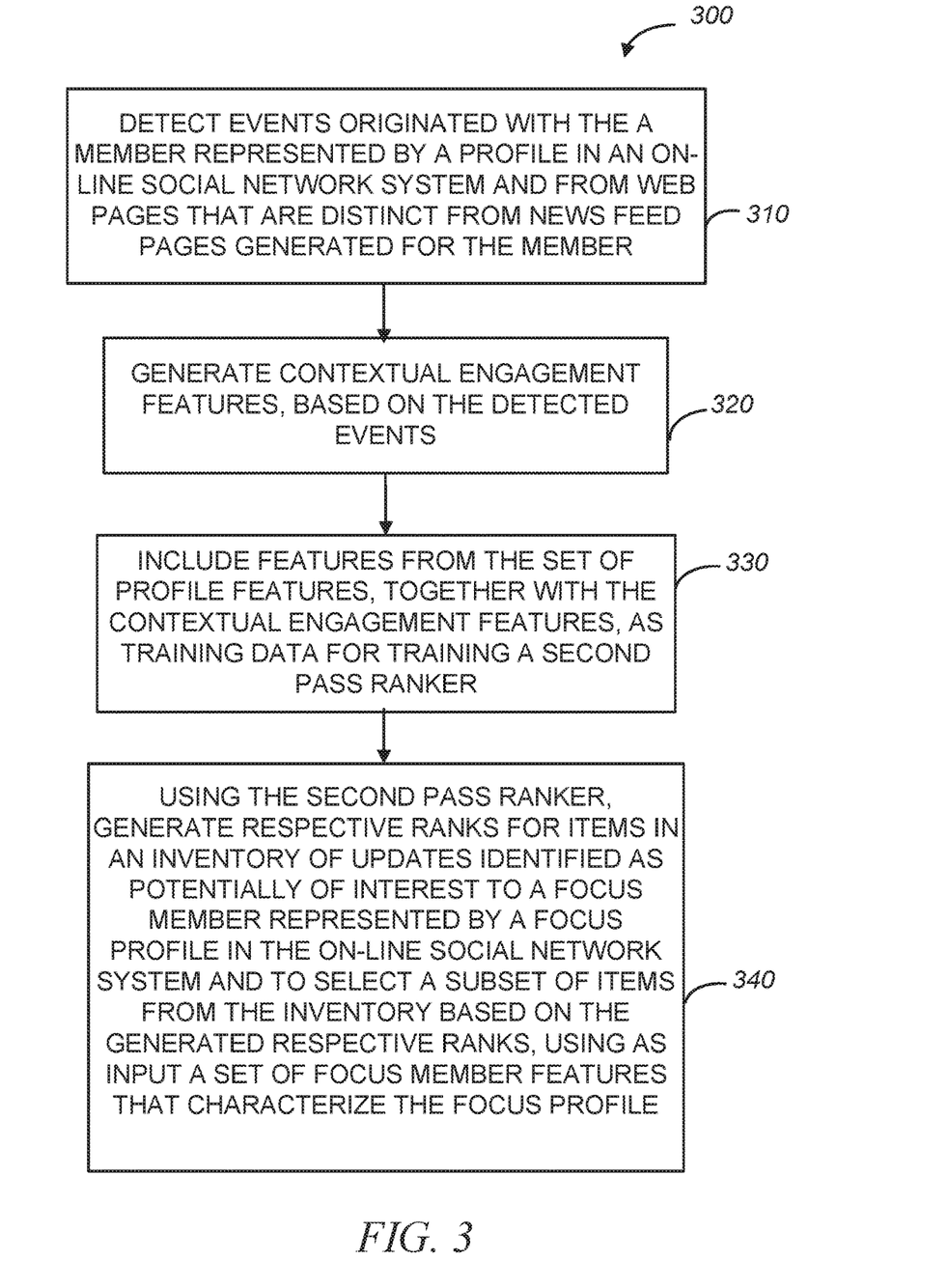
FIG. 3 is a flow chart of a method to generate contextual news feed in an on-line social network, in accordance with an example embodiment.

FIG. 3 is a flow chart of a method 300 to generate contextual news feed in an on-line social network for a member, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the events detector 230 of FIG. 2 detects events originated with a member and from web pages that are distinct from news feed pages generated for the member. The contextual features generator 240 of FIG. 2, at operation 320, generates contextual engagement features based on the events detected by the events detector 230. The training data selector 250 includes features from the set of profile features, together with the contextual engagement features generated by the contextual features generator 240 as training data for training the second pass ranker 260, at operation 330. At operation 340, the second pass ranker 260 (that has been trained at operation 330) generates respective ranks for items in an inventory of updates identified as potentially of interest to a focus member represented by a focus profile in the on-line social network system 142 and to selects a subset of items from the inventory based on the generated respective ranks.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
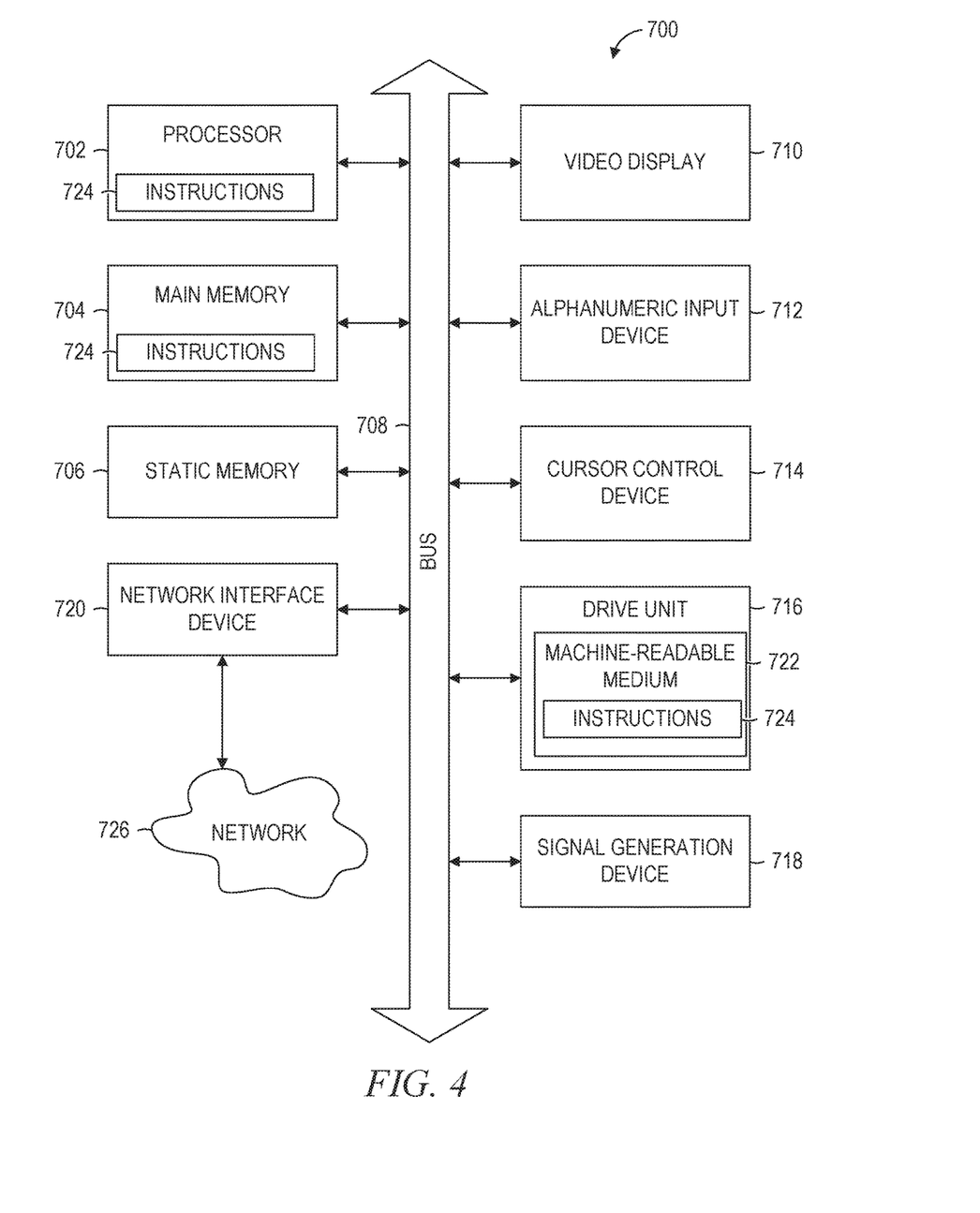
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

MODULES, COMPONENTS AND LOGIC

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to generate contextual news feed in an on-line social network have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
    maintaining member profiles representing members in an on-line social network system, the on-line social network system comprising a news feed web page generator to generate news feed web pages for presentation to members represented by respective member profiles;
    detecting events originated with the member profiles from web pages that are distinct from news feed pages generated for the respective member profiles by the news feed web page generator;
    using at least one processor, generating contextual engagement features, based on the detected events, the contextual engagement features reflecting respective areas of a web site provided by the on-line social network system where respective events occurred;
    including the contextual engagement features as training data for training a second pass ranker;
    for a focus profile representing a focus member in the on-line social network system, detecting a request to generate news feed web page, generating focus contextual engagement features based on recent events data representing events originated with the focus member from web pages that are distinct from news feed pages previously generated for the focus member, the recent events data represents respective events detected within a predetermined period of time from the request to generate news feed web page for the focus member, and providing the focus contextual engagement features as input to the second pass ranker; and
    generating, using the second pass ranker that was trained using the contextual engagement features, respective ranks for items in an inventory of updates identified as potentially of interest to a the focus member and selecting a subset of items from the inventory based on the generated respective ranks, the second pass ranker to generate the respective ranks using as input the focus contextual engagement features.

2. The method of claim 1, comprising constructing a news feed web page that includes the subset of items from the inventory.

3. The method of claim 2, comprising causing presentation of the news feed web page on a display device of the focus member.

4. The method of claim 1, wherein the events originated from web pages that are distinct from news feed pages generated for the member are events detected within the on-line social network system.

5. The method of claim 4, wherein the events detected within the on-line social network system include connect requests, email within the on-line social system, or job searches.

6. The method of claim 1, wherein the events originated from web pages that are distinct from news feed pages generated for the member are events detected outside of the on-line social network system.

7. The method of claim 1, wherein the events detected outside of the on-line social network system include events initiated from web pages generated by a third party entity with respect to the on-line social system, said web pages including a visual control actionable to share the web page to the on-line social system.

8. The method of claim 1, comprising:
    determining that one or more events represented by the recent events data is a job search; and
    increasing respective ranks for those items from the inventory that are job postings.

9. A computer-implemented system comprising:
    one or more processors; and
    a non-transitory computer readable storage medium comprising instructions that when executed by the one or processors cause the one or more processors to perform operations comprising:
    maintaining member profiles representing members in an on-line social network system, the on-line social network system comprising a news feed web page generator to generate news feed web pages for presentation to members represented by respective member profiles;
    detecting events originated with the member profiles from web pages that are distinct from news teed pages generated for the respective member profiles by the news feed web page generator;
    generating contextual engagement features based on the detected events, the contextual engagement features reflecting respective areas of a web site provided b the on-line social network system where respective events occurred;
    including the contextual engagement features as training data for training a second pass ranker; and
    generating, using the second pass ranker that was trained using the contextual engagement features, respective ranks for items in an inventory of updates identified as potentially of interest to a the focus member and selecting a subset of items from the inventory based on the generated respective ranks, the second pass ranker to generate the respective ranks using as input the focus contextual engagement features.

10. The system of claim 9, wherein the news feed web page generator is to construct a news feed web page that includes the subset of items from the inventory.

11. The system of claim 10, comprising causing presentation of the news feed web page on a display device of the focus member.

12. The system of claim 9, wherein the events originated from web pages that are distinct from news feed pages generated for the member are events detected within the on-line social network system.

13. The system of claim 12, wherein the events detected within the on-line social network system include connect requests, email within the on-line social system, or job searches.

14. The system of claim 9, wherein the events originated from web pages that are distinct from news feed pages generated for the member are events detected outside of the on-line social network system.

15. The system of claim 9, wherein the events detected outside of the on-line social network system include events initiated from web pages generated by a third party entity with respect to the on-line social system, said web pages including a visual control actionable to share the web page to the on-line social system.

16. A machine-readable non-transitory storage medium having instruction data executable by a machine to cause the machine to perform operations comprising:

maintaining member profiles representing members in an on-line social network system, the on-line social network system comprising a news feed web page generator to generate news feed web pages for presentation to members represented by respective member profiles;

detecting events originated with the member profiles from web pages that are distinct from news feed pages generated for the respective member profiles by the news feed web page generator;

generating contextual engagement features, based on the detected events, the contextual engagement features reflecting respective areas of a web site provided by the on-line social network system where respective events occurred;

including the contextual engagement features as training data for training a second pass ranker;

for a focus profile representing a focus member in the on-line social network system, detecting a request to generate news feed web page, generating focus contextual engagement features based on recent events data representing events originated with the focus member from web pages that are distinct from news feed pages previously generated for the focus member, the recent events data represents respective events detected within a predetermined period of time from the request to generate news feed web page for the focus member, and providing the focus contextual engagement features as input to the second pass ranker; and generating, using the second pass ranker that was trained using the contextual engagement features, respective ranks for items in an inventory of updates identified as potentially of interest to a the focus member and selecting a subset of items from the inventory based on the generated respective ranks, the second pass ranker to generate the respective ranks using as input the focus contextual engagement features.

* * * * *

UNITED STATES PATENT AND TRADEMARK OFFICE
CERTIFICATE OF CORRECTION

PATENT NO. : 10,193,847 B2
APPLICATION NO. : 15/171719
DATED : January 29, 2019
INVENTOR(S) : Lytkin et al.

Page 1 of 1

It is certified that error appears in the above-identified patent and that said Letters Patent is hereby corrected as shown below:

In the Claims

In Column 10, Line 9, in Claim 1, after "to", delete "a"

In Column 10, Line 55, in Claim 9, delete "teed" and insert --feed-- therefor In Column 10, Line 60, in Claim 9, delete "b" and insert --by-- therefor In Column 11, Line 1, in Claim 9, after "to", delete "a"

In Column 12, Line 30, in Claim 16, after "to", delete "a"

Signed and Sealed this
Seventeenth Day of March, 2020

Andrei Iancu
*Director of the United States Patent and Trademark Office*